(No Model.)

A. COX.
SHEET METAL PAN.

No. 275,806.  Patented Apr. 17, 1883.

UNITED STATES PATENT OFFICE.

ALLAN COX, OF CHELSEA, MASSACHUSETTS.

SHEET-METAL PAN.

SPECIFICATION forming part of Letters Patent No. 275,806, dated April 17, 1883.

Application filed November 15, 1882. (No model.)

*To all whom it may concern:*

Be it known that I, ALLAN COX, of Chelsea, in the county of Suffolk, State of Massachusetts, have invented a certain new and useful Improvement in Sheet-Metal Pans, of which the following is a description sufficiently full, clear, and exact to enable any person skilled in the art or science to which said invention appertains to make and use the same, reference being had to the accompanying drawings, forming a part of this specification, in which—

Figures 1, 2:
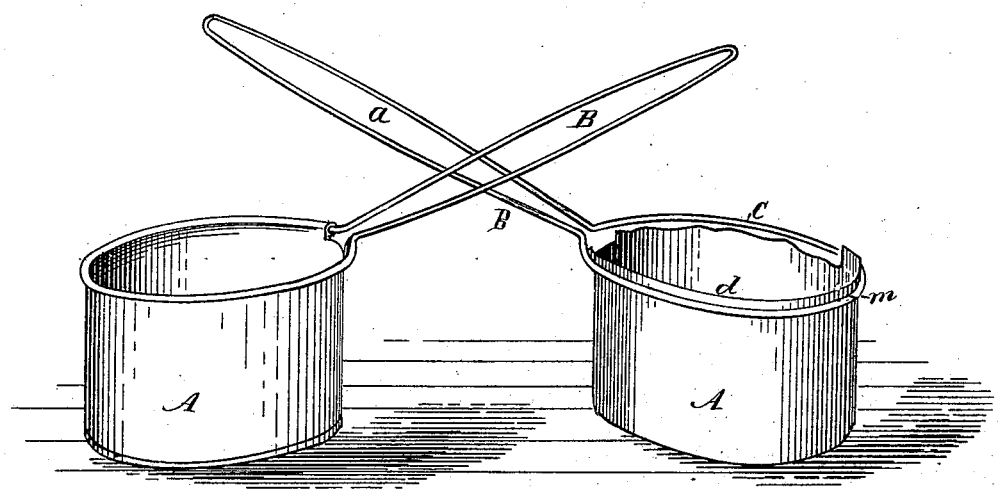

Figure 1 is an isometrical perspective view of my improved pan complete; Fig. 2, a like view, showing the method of attaching the handle to the body of the pan; and Figs. 3 and 4, views of pans made in the ordinary manner.

Like letters of reference indicate corresponding parts in the different figures of the drawings.

My improvement relates more especially to the handle of the pan and the method of attaching the same to the body; and it consists in a sheet-metal pan provided with a wire handle, which is integral with the rim-wire, or is extended to form the rim-wire, as best seen in Fig. 2.

Figures 3, 4:
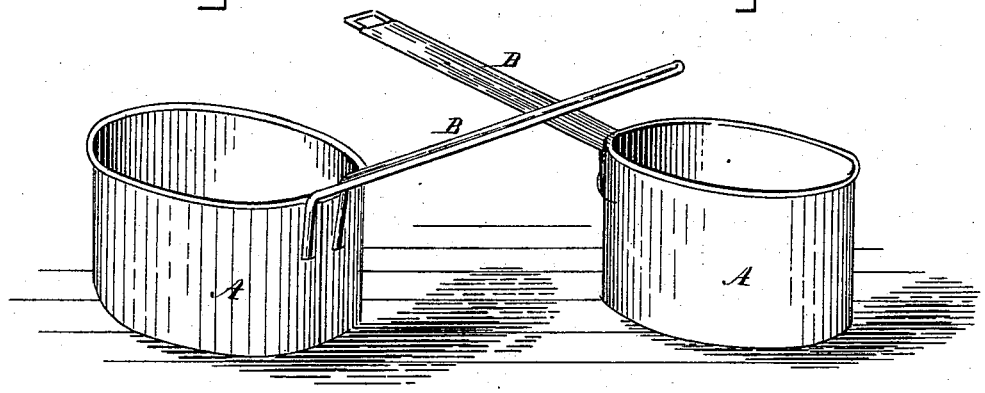

In ordinary pans of this description having wire handles the wire is usually attached to the body of the pan by soldering or riveting, or both, as shown in Fig. 3, being independent of the rim-wire. Handles attached as shown in Fig. 3 are also sometimes covered with tin, a strip of tin being placed on the handle and its edges bent down over the wires, as shown in Fig. 4; but both of these methods are objectionable for reasons which will be readily apparent, but principally on account of the cost of construction, the difficulty in keeping them clean, and, so far as relates to the handle shown in Fig. 4, the danger of burning the hands, the tin covering acting as a conductor of the heat. My invention is designed to obviate these objections, greatly reduce the cost of construction, and strengthen the pan.

In the drawings, A represents the body of the pan, which may be of tin or other suitable sheet metal; B, the handle, and C the rim-wire. The wire forming the handle is bent into an ellipse or loop, as seen at *a*, the two parts of the wire being brought nearly into contact where they enter the body A, at which point they separate and are bent outwardly in true curves, or in curves corresponding with the curvature or top of the pan, meeting at *m* on the side opposite the handle, and being secured to the body by means of the edge or flange *d*, which is turned over the wire, and set down by the means usually employed for wiring the rims of such pans.

It will be obvious that my improvement is adapted to any ordinary sheet-metal pan, whether round, square, rectangular, or oblong.

Having thus explained my invention, what I claim is—

As an improved article of manufacture, a sheet-metal pan having a handle and rim-wire which are integral, or composed of a single piece of wire, the sides of the pan extending entirely around its bottom and the rim-wire entirely around its sides, the handle being in the form of an elongated loop to enable it to be readily grasped and held in the hand, and narrowed near the body to enable the turned portions of the rim to be brought near together, and thereby form a better joint, or produce a better finish at that point, substantially as shown and described.

ALLAN COX.

Witnesses:
C. A. SHAW,
H. E. METCALF.